US012081958B2

(12) United States Patent
Zhang et al.

(10) Patent No.: US 12,081,958 B2
(45) Date of Patent: Sep. 3, 2024

(54) COIL WITH DIFFERENT WINDINGS

(71) Applicant: KNOWLES ELECTRONICS, LLC, Itasca, IL (US)

(72) Inventors: Yahui Zhang, Schaumburg, IL (US); Shehab Albahri, Hanover Park, IL (US); Richard Scheleski, Naperville, IL (US); Thomas Miller, Arlington Heights, IL (US); Charles King, Oak Park, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 18/349,416

(22) Filed: Jul. 10, 2023

(65) Prior Publication Data

US 2023/0353945 A1 Nov. 2, 2023

Related U.S. Application Data

(62) Division of application No. 17/134,436, filed on Dec. 27, 2020, now Pat. No. 11,729,556.

(60) Provisional application No. 62/955,179, filed on Dec. 30, 2019.

(51) Int. Cl.

| | |
|---|---|
| ***H04R 11/02*** | (2006.01) |
| ***H04R 1/02*** | (2006.01) |
| ***H04R 3/08*** | (2006.01) |
| ***H04R 3/12*** | (2006.01) |

(Continued)

(52) U.S. Cl.

CPC ............. *H04R 9/046* (2013.01); *H04R 1/025* (2013.01); *H04R 3/08* (2013.01); *H04R 3/12* (2013.01); *H04R 9/06* (2013.01); *H04R 9/063* (2013.01); *H04R 11/02* (2013.01); *H04R 2209/041* (2013.01)

(58) Field of Classification Search

CPC . H04R 1/025; H04R 3/08; H04R 3/12; H04R 9/025; H04R 9/046; H04R 9/06; H04R 9/063; H04R 11/02; H04R 2209/041

See application file for complete search history.

(56) References Cited

U.S. PATENT DOCUMENTS

| | | |
|---|---|---|
| 1,790,528 A | 1/1931 | Babcock |
| 1,822,095 A | 9/1931 | High |
| 3,671,684 A | 6/1972 | Tibbetts et al. |

(Continued)

FOREIGN PATENT DOCUMENTS

| | | |
|---|---|---|
| CN | 211152205 U | 7/2020 |
| CN | 211209921 U | 8/2020 |

(Continued)

OTHER PUBLICATIONS

Warren, Daniel et al.; U.S. Appl. No. 62/047,099; filed Sep. 8, 2014.

(Continued)

*Primary Examiner* — Huyen D Le

(57) ABSTRACT

Two coils are wrapped in one of numerous different implementations. In one implementation, the two coils are wrapped about a portion of a bobbin that has at least three flanges. The first coil is disposed about a first portion of the bobbin between the first flange and the second flange, and a second coil is disposed about a second portion of the bobbin between the second flange and the third flange.

19 Claims, 7 Drawing Sheets

(51) Int. Cl.
*H04R 9/04* (2006.01)
*H04R 9/06* (2006.01)

(56) References Cited

U.S. PATENT DOCUMENTS

| | | | | | |
|---|---|---|---|---|---|
| 3,838,216 | A | | 9/1974 | Watkins | |
| 4,016,376 | A | | 4/1977 | Neuhof | |
| 4,504,704 | A | | 3/1985 | Ohyaba et al. | |
| 5,216,723 | A | | 6/1993 | Froeschle et al. | |
| 5,610,989 | A | | 3/1997 | Salvage et al. | |
| 5,708,721 | A | | 1/1998 | Salvage et al. | |
| 6,078,677 | A | * | 6/2000 | Dolleman | H04R 11/06 381/418 |
| 7,050,602 | B2 | | 5/2006 | Miller | |
| 7,639,829 | B2 | | 12/2009 | Husung | |
| 7,869,610 | B2 | * | 1/2011 | Jayanth | H04R 7/06 381/418 |
| 9,872,019 | B2 | | 1/2018 | Song et al. | |
| 2002/0146141 | A1 | * | 10/2002 | Geschiere | H04R 25/604 381/361 |
| 2005/0123166 | A1 | | 6/2005 | Chen et al. | |
| 2016/0044420 | A1 | | 2/2016 | Albahri et al. | |
| 2021/0204064 | A1 | | 7/2021 | Zhang et al. | |
| 2021/0266673 | A1 | | 8/2021 | Wang et al. | |
| 2021/0385582 | A1 | * | 12/2021 | King | H04R 11/02 |
| 2022/0208441 | A1 | | 6/2022 | Scheleski et al. | |

FOREIGN PATENT DOCUMENTS

| | | |
|---|---|---|
| PH | 22020050740 | 3/2022 |
| PH | 22020050739 | 5/2022 |
| PH | 22020050755 | 6/2022 |
| PH | 22020050757 | 6/2022 |

OTHER PUBLICATIONS

Warren, Daniel et al.; U.S. Appl. No. 62/047,101; filed Sep. 8, 2014.
Warren, Daniel et al.; U.S. Appl. No. 62/047,104, filed Sep. 8, 2014.
Warren, Daniel et al.; U.S. Appl. No. 62/047,112; filed Sep. 8, 2014.
Warren, Daniel et al.; U.S. Appl. No. 62/047,121; filed Sep. 8, 2014.
Warren, Daniel et al.; U.S. Appl. No. 62/047,129; filed Sep. 8, 2014.
Warren, Daniel et al.; U.S. Appl. No. 62/047,140; filed Sep. 8, 2014.
Warren, Daniel et al.; U.S. Appl. No. 62/047,157; filed Sep. 8, 2014.

* cited by examiner

COIL WITH DIFFERENT WINDINGS

RELATED APPLICATIONS

This application is a divisional application of co-pending application Ser. No. 17/134,436, filed Dec. 27, 2020, entitled "Coil With Different Windings," the entire contents of which are hereby incorporated by reference, which claims priority to U.S. Provisional Patent Application Ser. No. 62/955,179 filed Dec. 30, 2019, entitled "Coil With Different Windings," the entire contents of which are hereby incorporated by reference.

TECHNICAL FIELD

This disclosure relates generally to acoustic devices and more specifically to coils with different windings as used therein.

BACKGROUND

Sound-producing acoustic devices including balanced armature receivers that convert an electrical input signal to an acoustic output signal characterized by a varying sound pressure level (SPL) are generally known. Such devices are used in hearing aids, headsets, hearables, ear buds among other hearing devices worn by a user. An acoustic receiver generally includes a motor and a coil to which an electrical excitation signal is applied. The coil is disposed about a portion of an armature (also known as a reed), a movable portion of which is disposed in equipoise between magnets, which are typically retained by a yoke. Application of the excitation or input signal to the receiver coil modulates the magnetic field, causing deflection of the reed between the magnets. The deflecting reed is linked to a movable portion (known as a paddle) of a diaphragm disposed within a partially enclosed receiver housing, wherein movement of the paddle forces air through a sound outlet or port of the housing.

BRIEF DESCRIPTION OF THE DRAWINGS

The objects, features, and advantages of the present disclosure will be more apparent to those of ordinary skill in the art upon consideration of the following Detailed Description with reference to the accompanying drawings.

Figure 1:
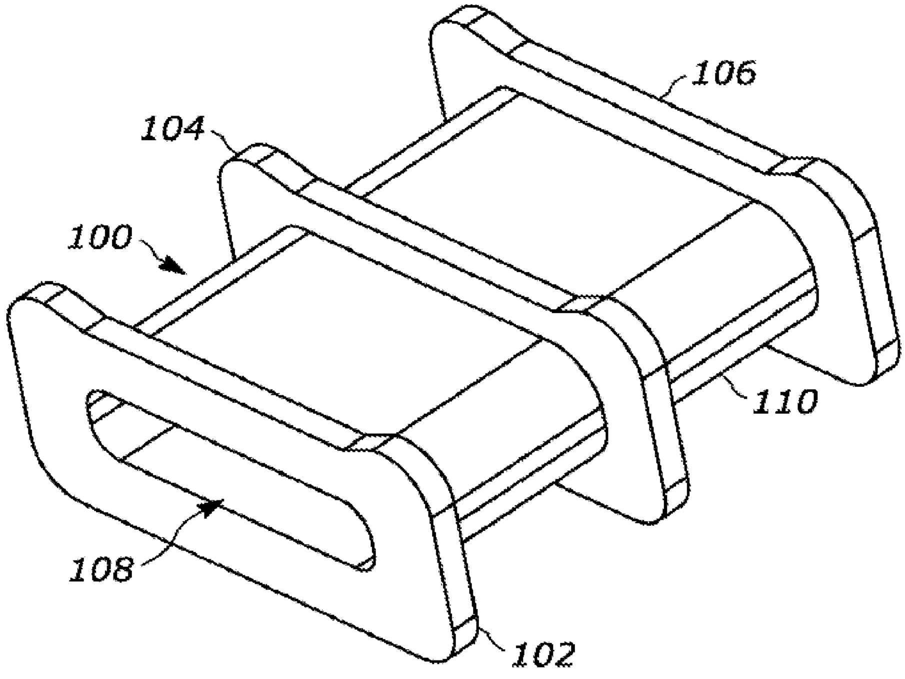
FIGS. 1 and 2 illustrate a bobbin used to wind one or more coils therearound according to some embodiments.

Those of ordinary skill in the art will appreciate that elements in the figures are illustrated for simplicity and clarity. It will be further appreciated that certain actions or steps may be described or depicted in a particular order of occurrence while those of ordinary skill in the art will understand that such specificity with respect to sequence is not actually required unless a particular order is specifically indicated. It will also be understood that the terms and expressions used herein have the ordinary meaning as is accorded to such terms and expressions with respect to their corresponding respective fields of inquiry and study except where specific meanings have otherwise been set forth herein.

DETAILED DESCRIPTION

The present disclosure pertains to coils implemented in sound-producing acoustic receivers (also referred to herein as "receivers"). The acoustic device containing the acoustic receiver may be embodied as a hearing aid or other hearing device, such as a behind-the-ear (BTE) device with a portion that extends into or on the ear, an in-the-canal (ITC) or partially in the ear canal device, a receiver-in-canal (RIC) device, a headset, a wired or wireless in-the-ear (ITE) earbud or earpiece, or as some other device that produces an acoustic output signal in response to an electrical input signal and is intended for use on, in, or in close proximity to a user's ear.

The present disclosure pertains to two coils wrapped in one of numerous different implementations. In one implementation, the two coils are wrapped about a portion of a bobbin that has at least three flanges. The first coil is disposed about a first portion of the bobbin between the first flange and the second flange, and a second coil is disposed about a second portion of the bobbin between the second flange and the third flange. In some embodiments a reactive circuit element is coupled with one of the two coils. In some examples, the reactive circuit element is coupled in series with one of the two coils, and in some other examples, the reactive circuit element is coupled in parallel with one of the two coils. In some examples, the reactive circuit element is mounted directly on the bobbin. In some examples, the reactive circuit element includes a capacitor.

In some other embodiments according to the above implementation with the bobbin, a plurality of electrical terminals are embedded in the bobbin, such that each electrical terminal is electrically coupled to a corresponding end of the two coils. In one aspect, there are four electrical terminals for the four ends of the coils, i.e. two for each coil. In some embodiments, the coils have different turns from each other. In some embodiments, the bobbin is implemented in an acoustic receiver with a housing, a diaphragm disposed in the housing, and an armature linked to the diaphragm. The diaphragm at least partially defines a front volume and a back volume where the front volume acoustically couples to an acoustic output of the receiver. The bobbin is implemented in the receiver such that the bobbin is disposed about a portion of the armature.

In one implementation, an acoustic receiver includes a housing, a diaphragm, an armature, two coils, and a terminal board. The coils are disposed about a portion of the armature and the terminal board is mounted on at least one of the coils. The terminal board has a number of electrical contacts that each couple to a corresponding end of the coils. Therefore, for two coils, there are four ends in total, so there are four electrical contacts. In one embodiment of this implementation, the two coils are attached to each other. In another embodiment, the terminal board is mounted on at least one of the coils via thermal bonding. In another embodiment, a reactive circuit element is coupled with one of the coils.

In some examples, the reactive circuit element is mounted on one of the coils, while in some other examples, the reactive circuit element is mounted directly on the terminal board. In some examples, the reactive circuit element is coupled in series with one of the coils, while in some other examples, the reactive circuit element is coupled in parallel with one of the coils. The reactive circuit element includes a capacitor in some examples. In some embodiments, the end portion of one coil shares a common contact with an end portion of the other coil, and in some embodiments, the coils have different wire gauges or different turns and possibly different resistive values from each other.

Figure 2:
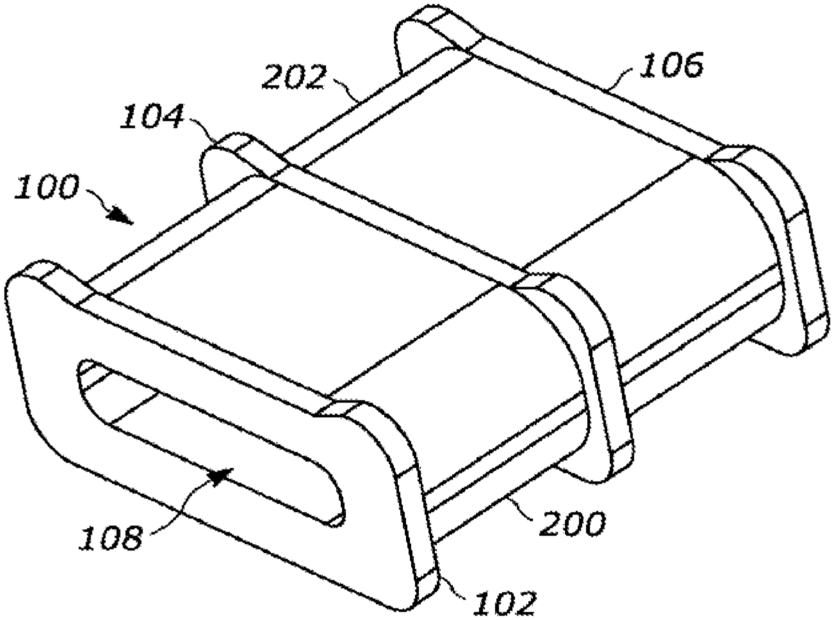
Figure 3:
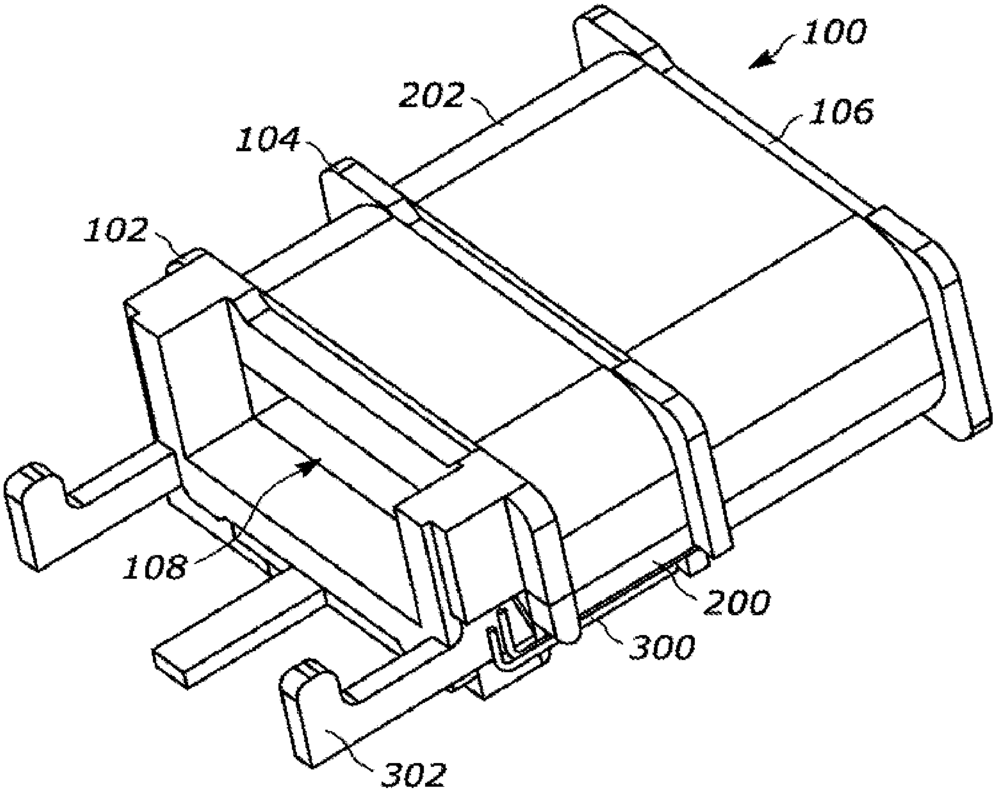
FIGS. 3 to 6 illustrate a bobbin with two coils wound therearound according to some embodiments.
Figure 4:
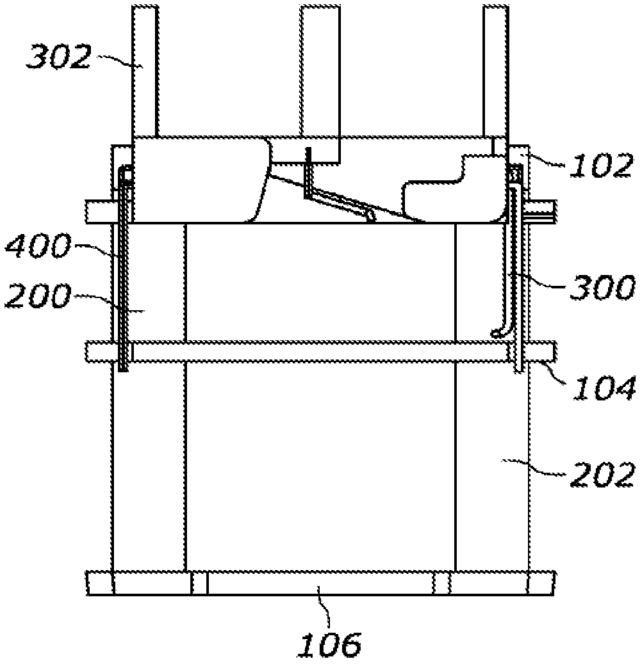
Figure 5:
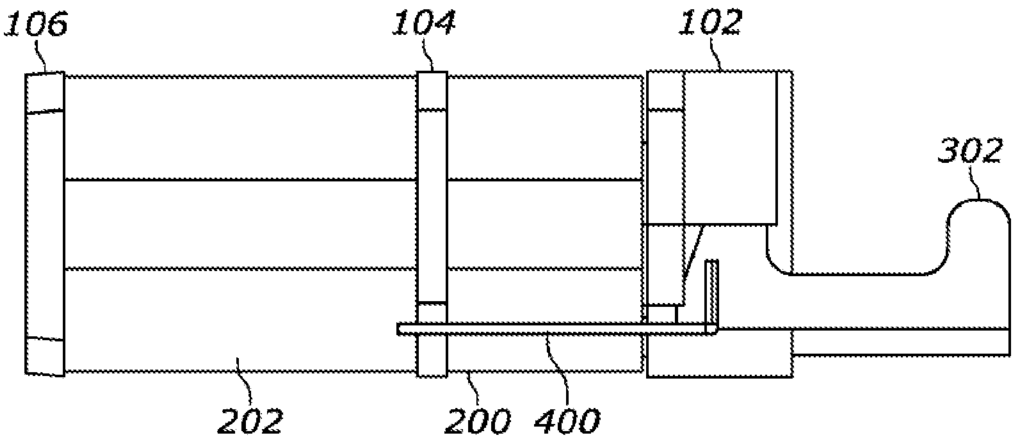
Figure 6:
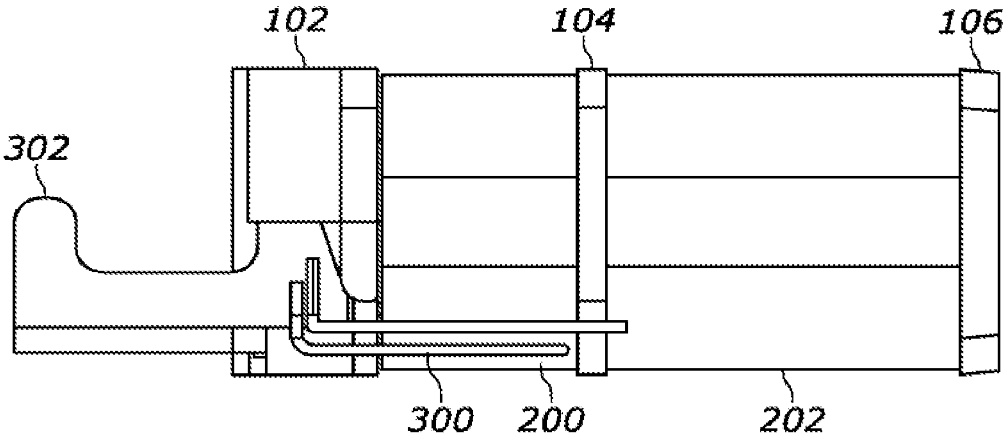

In FIGS. 1 through 6, a bobbin 100 is shown to have three flanges 102, 104, 106 extending therefrom. The flanges may be referred to as protrusions, projections, extensions, rims, or lips, as appropriate. The flanges 102, 104, 106 extend radially away from a longitudinal axis of the bobbin 100. In some embodiments, the flanges 102, 104, 106 are parallel with respect to each other. In some embodiments, the flanges 102, 104, 106 are monolithic or unitary with respect to a main body 110 of the bobbin 100. As shown in FIG. 1, the main body 110 is the portion of the bobbin 100 about which the coils are to be wrapped as shown in FIG. 2. In some embodiments, the flanges 102, 104, 106 are formed separately from the main body 110, and the bobbin 100 is formed by attaching the flanges 102, 104, 106 to the main body 110 via any suitable means of attachment, including but not limited to gluing, welding, soldering, and tapered fitting, for example. The bobbin 100 is made from any suitable non-conductive material, including but not limited to plastic, porcelain, and ceramic. The bobbin 100 also includes a lumen 108 to allow an armature to extend therethrough, as further explained herein.

The bobbin 100 provides support for one or more coils to be wrapped thereabout. When coils 200, 202 are wrapped about the main body 110, the first coil 200 and the second coil 202 are separated by the middle flange 104 as shown. Specifically, the first coil 200 is disposed between one external flange 102 and the middle flange 104, and the second coil 202 is disposed between the other external flange 106 and the middle flange 104. In some embodiments, the middle flange 104 is located halfway between the two external flanges 102, 106 along the main body 110. In some embodiments, the middle flange 104 is located closer to one external flange 102 or 106 than the other external flange. For example, as shown in FIGS. 3 through 6, the middle or second flange 104 is closer to the first flange 102 than the third flange 106.

FIGS. 3 through 6 also show electrical terminals 300, 400 extending between the coils 200, 202 and connection members 302. The connection members 302 extend longitudinally from the first flange 102 to provide means for other components to couple to the bobbin 100 more readily. For example, the other components include terminal boards and/or reactive circuit elements, as further explained herein. In some embodiments, the coils 200 and 202 are two different sections of the same continuous coil, which is made of a single wire. The difference between the coils 200 and 202 (or more specifically, coil sections 200 and 202 in such embodiments) lies in how the coils are wound, for example as determined by the number of turns that form each coil.

As is known in the art, the intensity or strength of a magnetic field formed by passing a current through a coil is determined by "amp-turns" and is directly influenced by both the number of turns that compose the coil and the current passing through the coil. If more turns are made in a coil at a given current, the magnetic field produced in return is greater. Therefore, to vary the magnetic field produced by the same coil in two different sections, the number of turns in each section can be adjusted accordingly. Using the bobbin 100 as an example, the first coil section 200 and the second coil section 202 are wound such that the number of turns varies for each section, and the flanges 102, 104, 106 assist to maintain the coil sections 200, 202. In some embodiments, the middle flange 104 is used as a marker to notify the machine that performs the coil winding to adjust the number of turns upon reaching the middle flange 104, causing the coil sections 200, 202 on either side of the middle flange 104 to have differing numbers of turns.

Figure 7:
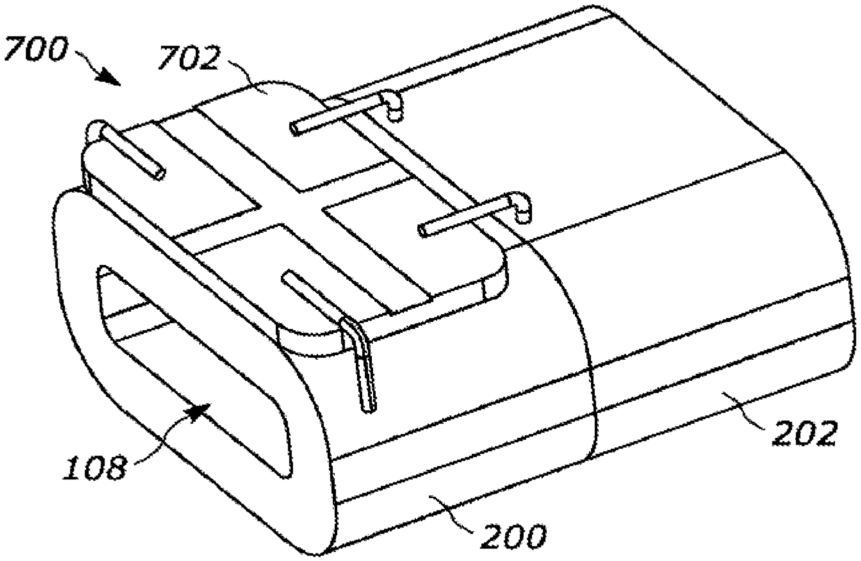
FIG. 7 illustrates two coils attached to each other and an electrical terminal interface further attached to an outer surface of one of the coils according to some embodiments.

FIG. 7 shows an example of a pair of coils 200, 202 attached to each other to form a coil assembly with two different number of turns. Specifically, the first coil 200 has a first number of turns in a first winding (marked by Winding 1, or "W1" on the figure), and the second coil 202 has a second number of turns in a second winding (Winding 2, or "W2"). The two coils 200, 202 are attached to each other via any suitable means, for example via gluing or thermal bonding, among others. The coils 200, 202 are formed to define the lumen 108 therethrough which extends along a longitudinal axis formed by the coils 200, 202.

A terminal board 700 is mounted on the first coil 200 such that each end of the coils 200, 202 is electrically coupled with an electrical contact 702 of the terminal board 700. For example, when there are two coils 200, 202, there are four ends, so the terminal board 700 has at least four electrical contacts 702 to accommodate for all the ends of the coils 200, 202. In other implementations, one end portion of each coil is coupled to the same contact on a terminal board having only 3 contacts. In some embodiments, the terminal board 700 is mounted on the second coil 202 instead of the first coil 200, or on both coils 200, 202. The ends of the coils 200, 202 are electrically coupled with the corresponding electrical contacts 702 via any suitable means, including but not limited to soldering. Furthermore, the terminal board 700 is mounted on one or more of the coils 200, 202 via any suitable attachment means, including but not limited to gluing. Additionally, in some embodiments, the terminal board 700 has one or more reactive circuit elements attached thereto or mounted thereon, as suitable, as further explained herein.

Figure 8:
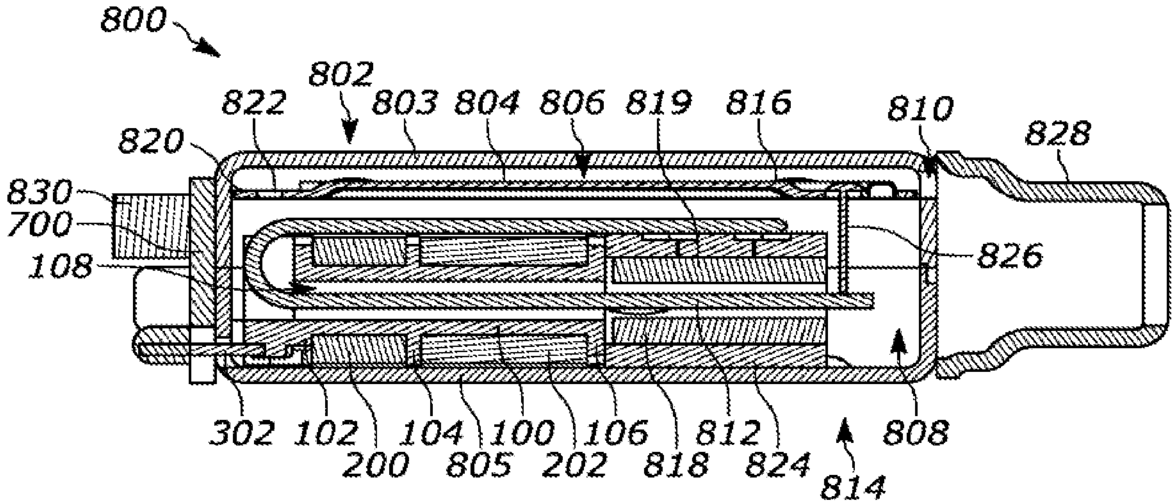
FIG. 8 is a cross-sectional view of a receiver utilizing the bobbin and coils as shown in FIGS. 3 to 6 according to some embodiments.

FIG. 8 illustrates an example of an acoustic receiver 800 that includes the bobbin 100 as explained herein, according to some embodiments. The acoustic receiver 800 has a housing 802 (e.g., a metal or plastic casing) in which a diaphragm 804 separates an internal volume into a front volume 806 and a back volume 808 such that the front volume 806 is acoustically coupled with an acoustic output 810 and the back volume 808 at least partially contains a receiver motor assembly 814. One of the components of the receiver motor assembly 814 is an armature 812 which extends through the lumen 108 of the bobbin 100. In some examples, the housing 802 is formed using a cover 803 and a cup 805 that are coupled together.

The individual components of the receiver motor assembly 814 used in the acoustic receiver 800 are also shown. For example, the receiver motor assembly 814 includes a paddle 816, an armature 812 (also known as a reed), and the coils 200, 202. The paddle 816, which is a part of the diaphragm 804, is supported on one end by a support structure 820 moveably coupling the paddle 816 to the receiver housing 802 at the hinge 822. The receiver housing 102 additionally includes a yoke 824 which holds a pair of magnets 818, 819 between which a portion of the armature 812 movably extends. The link 826 connects the armature 812 with the paddle 816 such that the paddle moves as the armature 812 deflects relative to the magnets 818, 819 in response to application of an electrical signal to the coils 200, 202. In some examples, the receiver housing 802 is attached to a nozzle 828 acoustically coupled with the acoustic output 810. In some examples, the receiver housing 802 also includes the terminal board 700 attached thereto that has at least one reactive circuit element 830 mounted thereon. The reactive circuit element 830 includes one or more inductors and/or capacitors that absorb any power passing through the network, which is then stored and eventually returned to the network to which they are connected. The placement of the reactive circuit element 830 relative to the coils 200, 202 affects the sound pressure and acoustic impedance of the receiver 800 as shown below.

Figure 9:
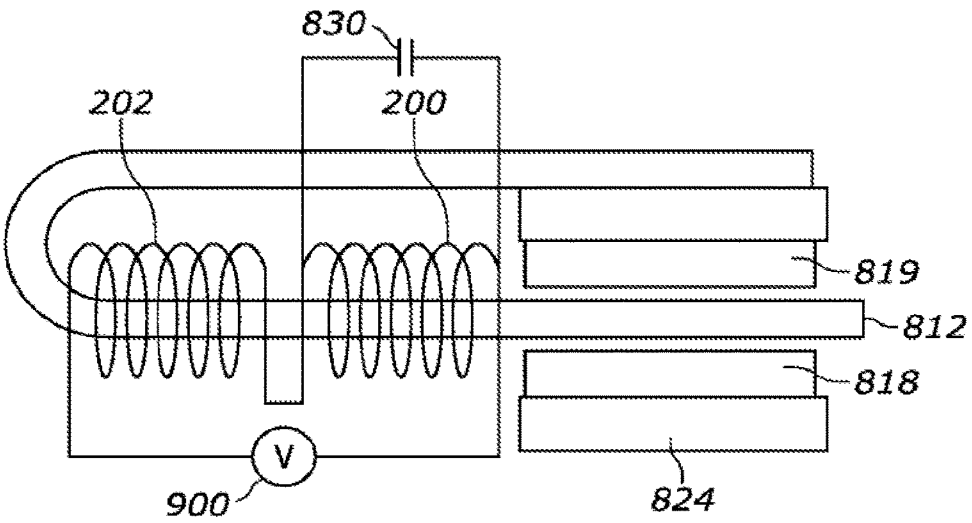
FIG. 9 is a schematic diagram of an armature operatively coupled with two coils and a capacitor disposed in parallel with one of the coils, according to some embodiments.
Figure 12:
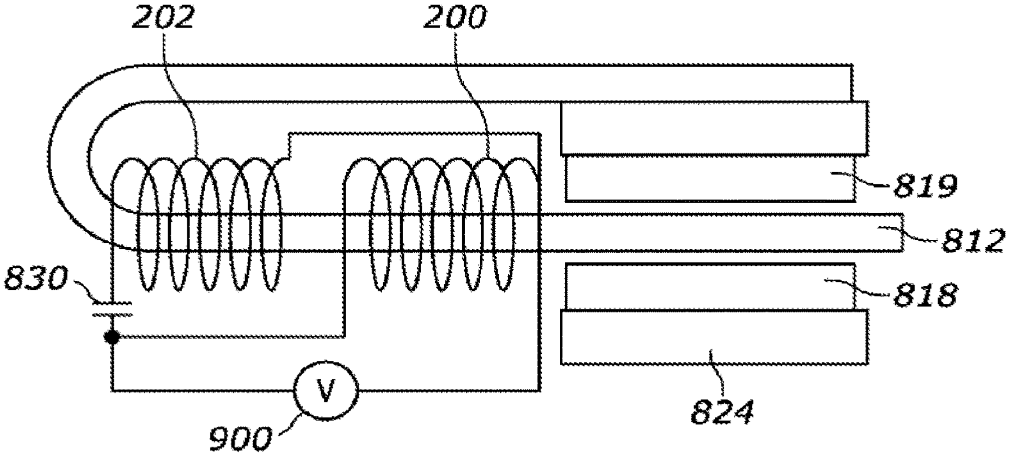
FIG. 12 is a schematic diagram of an armature operatively coupled with two coils and a capacitor disposed in series with one of the coils, according to some embodiments.

FIGS. 9 and 12 illustrate two different possible placements of the reactive circuit element 830 with respect to the coils 200 and 202, according to some embodiments. The reactive circuit element 830 is shown in FIG. 9 as a capacitor placed in parallel with the first coil 200, and is shown in FIG. 12 as a capacitor placed in series with the second coil 202. In both figures, a voltage source 900 is connected to one end from each of the coils 200, 202 to form a circuit. The voltage source 900 in some examples is controlled by a controller (not shown) of an integrated circuit, and the activation of the voltage source 900 creates a magnetic field to be formed, and the magnetic field causes the armature 812 to move between the magnets 818, 819. The movement of the link 826 translates the movement of the armature 812 to the paddle 816 which causes a change in the acoustic output of the receiver 800. In additional examples, the reactive circuit element 830 can be positioned in series with the first coil 200 or in parallel with the second coil 202.

Figure 10:
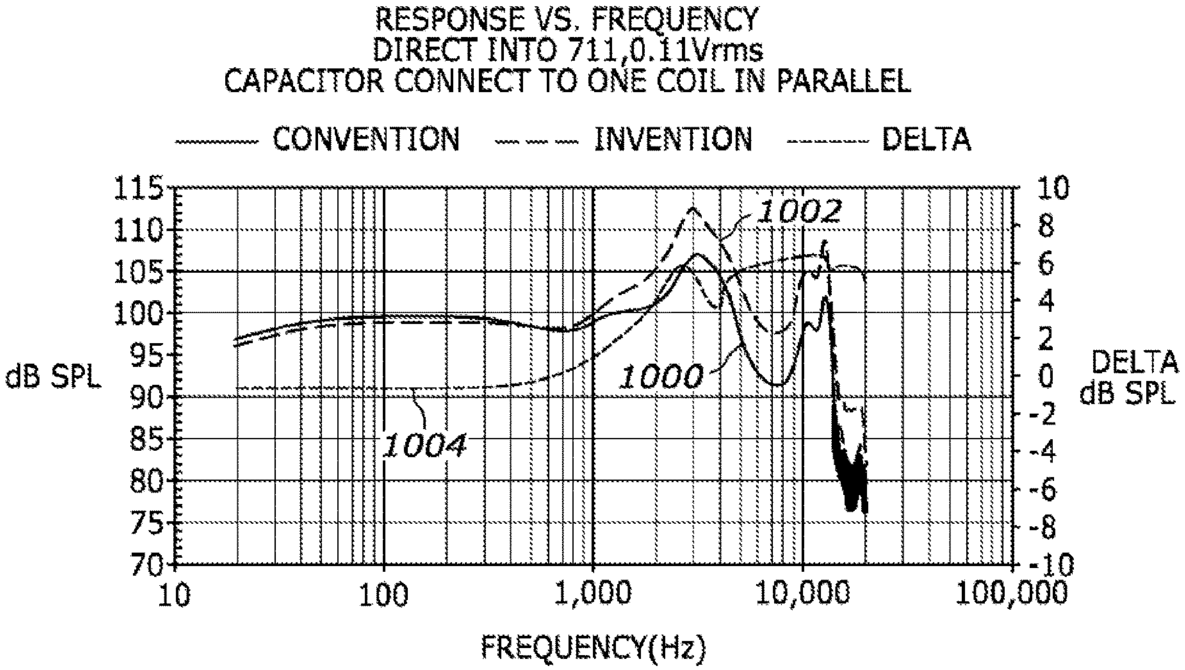
FIG. 10 is a graph illustrating the relationship between frequency and sound pressure level (SPL) in a receiver implementing the configuration of FIG. 9, according to some embodiments.
Figure 11:
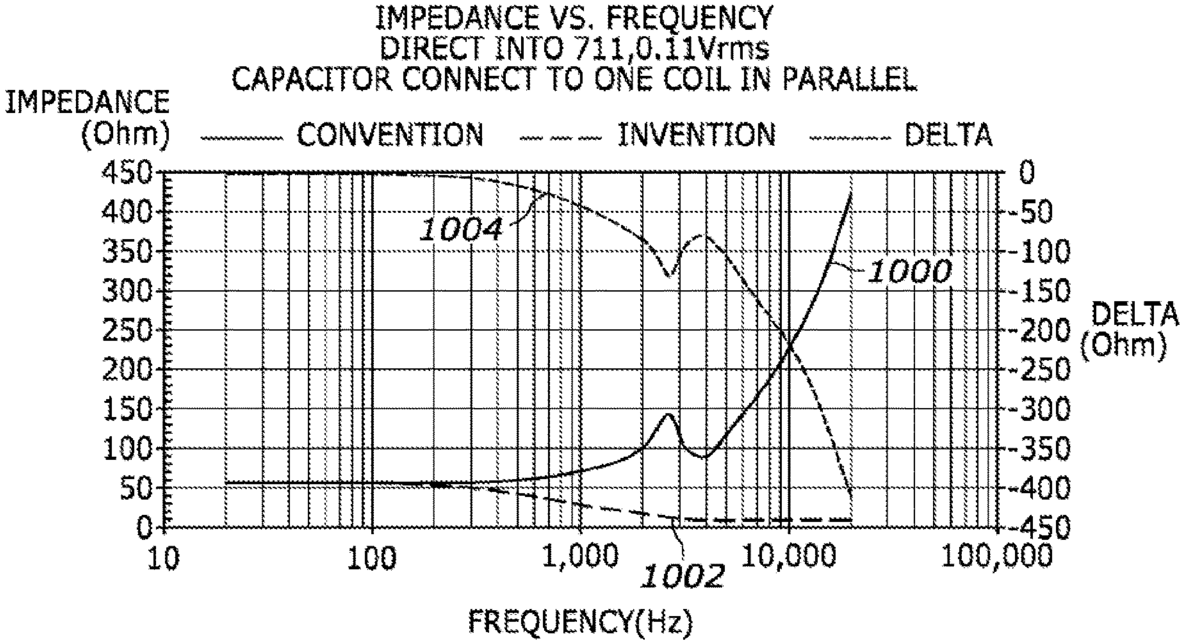
FIG. 11 is a graph illustrating the relationship between frequency and impedance in a receiver implementing the configuration of FIG. 9, according to some embodiments.
Figure 13:
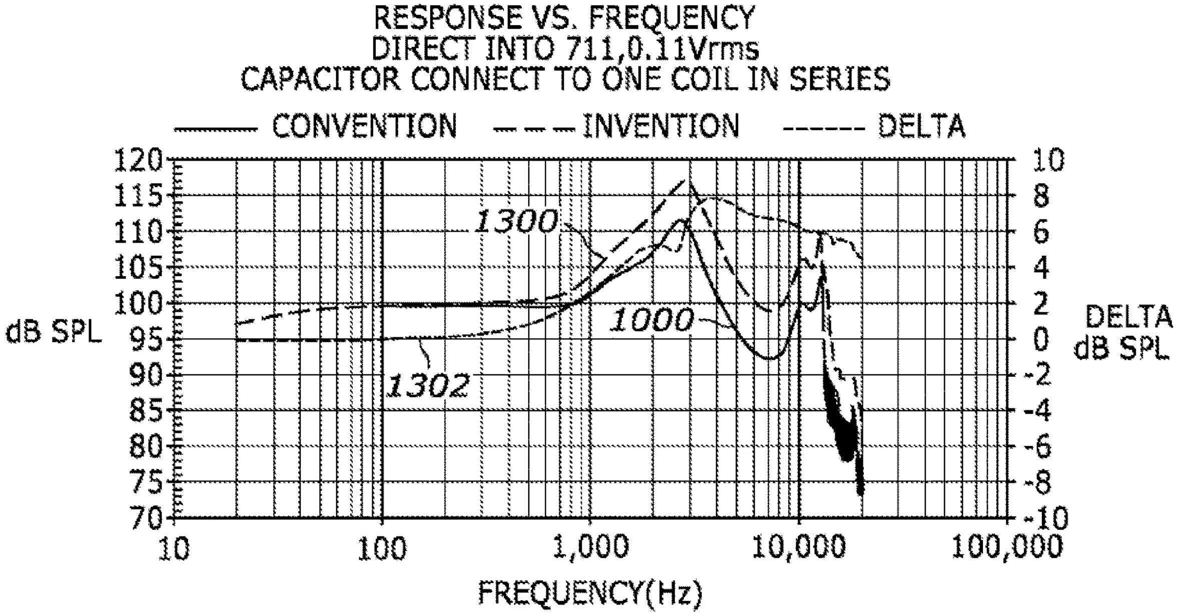
FIG. 13 is a graph illustrating the relationship between frequency and sound pressure level (SPL) in a receiver implementing the configuration of FIG. 12, according to some embodiments.
Figure 14:
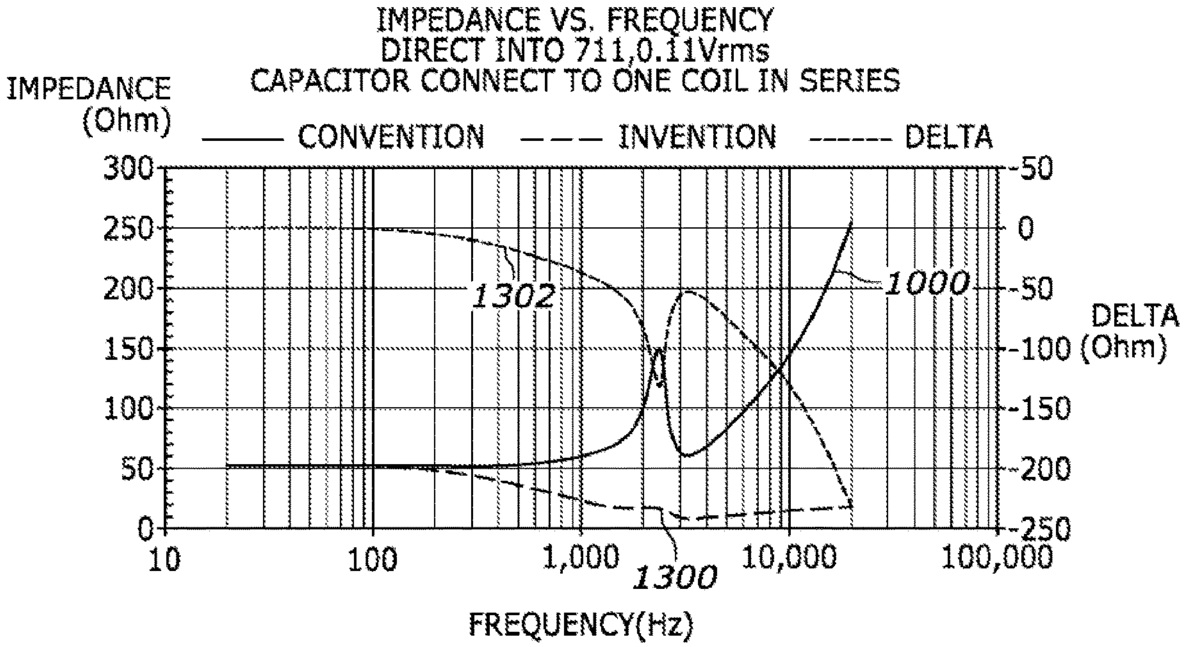
FIG. 14 is a graph illustrating the relationship between frequency and impedance in a receiver implementing the configuration of FIG. 12, according to some embodiments.

FIGS. 10 and 13 show the difference in the sound pressures, as measured in dB of sound pressure level (SPL), between a conventional circuit with no reactive circuit element and the presently disclosed circuit with the capacitor as implemented in FIGS. 9 and 12, respectively. FIGS. 11 and 14 show the difference in the acoustic impedance, as measured in Ohms, between the conventional circuit and the presently disclosed circuit as implemented in FIGS. 9 and 12, respectively. Specifically, measurements are taken in the range between 20 Hz and 20 kHz for both the conventional circuit and the circuit in which the reactive circuit element 830 is a 7 μF capacitor and the input voltage has a root mean square (rms) of 0.11 V. Furthermore, the first coil 200 has 280 turns to form a DC resistance of 50 Ohms and the second coil 202 has 80 turns to form a DC resistance of 3 Ohms. In contrast, the conventional circuit uses a single coil of 320 turns to form a DC resistance of 47 Ohms.

FIGS. 10 and 11 compare conventional circuit measurements 1000 with presently disclosed "parallel configuration" circuit measurements 1002 for the circuit shown in FIG. 9. A delta line 1004 is also shown, where the delta line 1004 is calculated by subtracting the "parallel configuration" measurements 1002 from the conventional circuit measurements 1000. According to FIG. 10, the "parallel configuration" measurements 1002 of the sound pressures are shown as being constantly greater than the conventional circuit measurements 1000 between the frequency range from 800 Hz to 20 kHz, resulting in positive delta values 1004. Also, according to FIG. 11, the "parallel configuration" measurements 1002 of the acoustic impedance are shown as being less than the conventional circuit measurements 1000 between the same range, resulting in negative delta values 1004. Therefore, the "parallel configuration" circuit shown in FIG. 9 achieves higher sound pressure levels and lower acoustic impedance than the conventional circuit.

FIGS. 13 and 14 compare the conventional circuit measurements 1000 with presently disclosed "series configuration" circuit measurements 1300 for the circuit shown in FIG. 12. A delta line 1302 is also shown, where the delta line 1302 is calculated by subtracting the "series configuration" measurements 1300 from the conventional circuit measurements 1000. According to FIG. 13, the "series configuration" measurements 1300 of the sound pressure are shown as being constantly greater than the conventional circuit measurements 1000 between the frequency range from 200 Hz to 20 kHz, resulting in positive delta values 1302. Also, according to FIG. 14, the "series configuration" measurements 1300 of the acoustic impedance are shown as being less than the conventional circuit measurements 1000 between the same range, resulting in negative delta values 1302. Therefore, the "series configuration" circuit shown in FIG. 12 also achieves higher sound pressure levels and lower acoustic impedance than the conventional circuit.

According to FIG. 10, the "parallel configuration" circuit achieves up to approximately 6 dB greater SPL than the conventional circuit, and according to FIG. 13, the "series configuration" circuit achieves up to approximately 8 dB greater SPL than the conventional circuit, although these values may vary based on the number of turns in the coils as used or the capacitance of the reactive circuit element. Greater SPL values allow for greater displacement of the paddle 816 in response to an input signal, thereby improving the acoustic output in the frequency ranges as mentioned above.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

What is claimed is:

1. An acoustic receiver comprising:

a housing;

a diaphragm disposed in the housing and at least partially defining a front volume and a back volume, the front volume acoustically coupled to an acoustic output of the receiver;

an armature linked to the diaphragm;

a first coil disposed about a portion of the armature;

a second coil disposed about a portion of the armature; and a terminal board mounted on the first coil or the second coil, the terminal board having electrical contacts, each contact electrically coupled to a corresponding end of the first coil or the second coil.

2. The acoustic receiver of claim 1, wherein the first coil and the second coil are attached to each other.

3. The acoustic receiver of claim 1, wherein the terminal board is mounted on the first coil or the second coil via thermal bonding.

4. The acoustic receiver of claim 1, further comprising a reactive circuit element coupled with first coil or the second coil.

5. The acoustic receiver of claim 4, wherein the reactive circuit element is mounted on the first coil or the second coil.

6. The acoustic receiver of claim 4, wherein the reactive circuit element is mounted directly on the terminal board.

7. The acoustic receiver of claim 4, wherein the reactive circuit element is coupled in series with the first coil or the second coil.

8. The acoustic receiver of claim 4, wherein the reactive circuit element is coupled in parallel with the first coil or the second coil.

9. The acoustic receiver of claim 4, wherein the reactive circuit element includes a capacitor.

10. The acoustic receiver of claim 4, wherein the first coil and the second coil are electrically connected in series and the reactive component is electrically connected in parallel with the first coil or the second coil.

11. The acoustic receiver of claim 10, wherein the reactive component is a capacitor.

12. The acoustic receiver of claim 11 further comprising a bobbin disposed about the armature, wherein the first and second coils are disposed about the bobbin.

13. The acoustic receiver of claim 12 further comprising conductive connection members embedded in the bobbin, the first and second coils electrically connected to the conductive connection members.

14. The acoustic receiver of claim 4, wherein the first coil and the second coil are electrically connected in parallel and the reactive component is electrically connected in series with the first coil or the second coil.

15. The acoustic receiver of claim 14, wherein the reactive component is a capacitor.

16. The acoustic receiver of claim 15 further comprising a bobbin disposed about the armature, wherein the first and second coils are disposed about the bobbin.

17. The acoustic receiver of claim 16 further comprising conductive connection members embedded in the bobbin, the first and second coils electrically connected to the conductive connection members.

18. The acoustic receiver of claim 1, wherein an end portion of the first coil shares a common contact with an end portion of the second coil.

19. The acoustic receiver of claim 1, wherein the first coil has a different number of turns from the second coil.

* * * * *